United States Patent Office 3,085,876
Patented Apr. 16, 1963

3,085,876
PROCESS FOR DISPERSING A REFRACTORY METAL OXIDE IN ANOTHER METAL
Guy B. Alexander and Paul C. Yates, Brandywine Hundred, Del., assignors to E. I. du Pont de Nemours and Company, Wilmington, Del., a corporation of Delaware
No Drawing. Filed Mar. 1, 1960, Ser. No. 11,959
6 Claims. (Cl. 75—206)

This invention relates to processes for making dispersions of refractory metal oxides in metals wherein the refractory oxide particles are in the size range of 5 to 500 millimicrons and the properties of the metal are modified. The invention is more particularly directed to such processes comprising coprecipitating (a) a water-insoluble compound of a metal, said compound being selected from the group of oxygen- and sulfur-containing compounds, said metal being one having an oxide with a free energy of formation at 27° C. of up to 105 kilocalories per gram atom of oxygen in the oxide, and (b) a refractory metal oxide having a free energy of formation at 1000° C. greater than 60 kilocalories per gram atom of oxygen in the oxide, the ultimate particles of the refractory oxide having a size less than 5 millimicrons, roasting the coprecipitate in an oxygen-containing atmosphere at from 400 to 1000° C. wherein the water-insoluble compound of the metal is converted to the anhydrous metal oxide and the size of the ultimate refractory oxide particles is increased, continuing the heating in said temperature range until the size of said ultimate particles is in the range of 5 to 500 millimicrons, thereafter reducing said metal oxide to the corresponding metal, and sintering the reduced product until the surface area is less than ten square meters per gram.

The so-called "super alloys" have been developed for service at extremely high temperatures and very high stress and strain and with a maximum possible service life. In each of these directions, however, substantial additional improvement is greatly desired. It has recently been proposed to improve the properties of metals, including super alloys, by dispersing in them small fragments of refractory materials, on the theory that the fragments would lodge at the grain boundaries and prevent slippage, whereby the metals would be hardened. It has been suggested, for instance, to use various high-melting metalloids as the refractory particles. However, the means for effecting such dispersion of metalloids in metals have been subject to various objections.

More recently it has been suggested to coprecipitate pre-formed refractory oxide particles of the desired size, viz., discrete particles having an average dimension of 5 to 500 millimicrons, together with an oxygen compound of the desired metal, followed by reduction of the oxygen compound to the metal. While this method gives satisfactory results so far as the end product is concerned, it requires the pre-forming of the refractory oxide particles in the desired size and this is not always feasible or economical to do.

If, on the other hand, one precipitates the refractory as aggregates of particles which individually and in their non-aggregated state (that is, the ultimate particles) are smaller than the desired size, and then attempts to coat the aggregates with metal, one finds that the metal merely envelopes the aggregates as an outer skin and proper dispersion of the refractory oxide is not obtained.

Now according to the present invention, it has been found that the necessity for pre-forming the refractory oxide as particles in the desired size range can be avoided and proper dispersion of the particles in said desired size range can be achieved by processes in which a water-insoluble compound of a metal, said compound being selected from oxygen- and sulfur-containing compounds and the metal being the one which is ultimately to be the matrix metal, is coprecipitated with the refractory metal oxide, the ultimate particles of the refractory oxide having a size less than 5 millimicrons, the coprecipitate is roasted in an oxygen-containing atmosphere to from 400 to 1000° C. whereby the compound of the metal is converted to the anhydrous metal oxide and the size of the ultimate refractory oxide particles is increased, the heating in said temperature range is continued until the size of the ultimate particles is in the range of 5 to 500 millimicrons, the matrix metal compound is reduced, as with hydrogen, to the corresponding metal and the reduced product is sintered until the surface area is less than ten square meters per gram. The process is applicable for matrix metals which have an oxide with a free energy of formation at 27° C. of up to 105 kilocalories per gram atom of oxygen in the oxide and for refractory metal oxides which have a free energy of formation at 1000° C. greater than 60 kilocalories per gram atom of oxygen in the oxide.

It will be seen that the novel processes provide a method for forming particles of the desired size in situ in the reaction mixture, and thereby avoid both the difficulty of pre-forming particles in the desired size range and the difficulties inherent in changing the size of the particles after the metal matrix has been formed.

For convenience in describing this invention, certain abbreviations will be used. Free energy of formation will be kilocalories per gram atom of oxygen in the oxide, as determined at 27° C. unless otherwise specified, and will be called $\Delta F$. Surface areas of the refractory oxides will be in terms of square meters per gram, and particle diameters will be millimicrons, abbreviated $m\mu$. Particle densities will be grams per milliliter. The particulate refractory oxide will sometimes be referred to as the filler.

THE MATRIX METAL

The matrix metal into which the filler is to be dispersed according to this invention must be a metal having an oxide which has a $\Delta F$ at 27° C. of up to 105 kilocalories per gram atom of oxygen in the oxide. This group includes metals whose oxides can be reduced by hydrogen at 1000° C.

More specifically the metals in the following table are classed as matrix metals for the purpose of the present disclosure:

| Matrix Metal | Oxide | $\Delta F$ of Oxide at 27° C. |
|---|---|---|
| Chromium | $Cr_2O_3$ | 83 |
| Manganese | $MnO$ | 87 |
| Niobium | $NbO_2$ | 90 |
| Silicon | $SiO_2$ | 98 |
| Tantalum | $Ta_2O_5$ | 92 |
| Titanium | $TiO_2$ | 103 |
| Vanadium | $VO$ | 99 |
| Iron | $FeO$ | 59 |
| Cobalt | $CoO$ | 52 |
| Nickel | $NiO$ | 51 |
| Copper | $Cu_2O$ | 35 |
| Cadmium | $CdO$ | 55 |
| Thallium | $Tl_2O$ | 40 |
| Germanium | $GeO_2$ | 58 |
| Tin | $SnO$ | 60 |
| Lead | $PbO$ | 45 |
| Antimony | $Sb_2O_3$ | 45 |
| Bismuth | $Bi_2O_3$ | 40 |
| Molybdenum | $MoO_2$ | 60 |
| Tungsten | $WO_2$ | 60 |
| Rhenium | $ReO_3$ | 45 |
| Indium | $In_2O_3$ | 65 |
| Silver | $Ag_2O$ | 3 |
| Gold | $Au_2O$ | 0 |
| Ruthenium | $RuO_2$ | 25 |
| Palladium | $PdO$ | 15 |
| Osmium | $OsO_4$ | 20 |
| Platinum | $PtO$ | 0 |
| Rhodium | $Rh_2O$ | 20 |

THE REFRACTORY OXIDE FILLER

A relatively non-reducible oxide is selected as the filler, that is, an oxide which is not reduced to the corresponding metal by hydrogen, or by the metal in which it is embedded, at temperatures below 1000° C. Such fillers have a ΔF at 1000° C. of more than 60 kilocalories per gram atom of oxygen in the oxide. The oxide itself can be used as the starting material or it can be formed during the process by heating another metal-oxygen-containing material.

The metal-oxygen-containing material can, for example, be selected from the group consisting of oxides, carbonates, oxalates, and, in general, compounds which, after heating to constant weight at 1500° C., are refractory metal oxides. The ultimate oxide must have a melting point above 1000° C. A material with a melting point in this range is referred to as "refractory"—that is, difficult to fuse. Filler particles which melt or sinter at lower temperatures become aggregated.

The filler can be a mixed oxide, particularly one in which each oxide conforms to the melting point and ΔF above stated. Thus, magnesium silicate, $MgSiO_3$, is a mixed oxide of $MgO$ and $SiO_2$. Each of these oxides can be used separately; also, their products of reaction with each other are useful. Thus, the filler is a single metal oxide or a reaction product of two or more metal oxides; also, two or more separate oxides can be used as the filler. The term "metal oxide filler" broadly includes spinels, such as $MgAl_2O_4$ and $ZnAl_2O_4$, metal carbonates, such as $BaCO_3$, metal aluminates, metal silicates such as magnesium silicate and zircon, metal titanates, metal vanadates, metal chromites, and metal zirconates. With specific reference to silicates, for example, one can use complex structures, such as sodium aluminum silicate, calcium aluminum silicate, calcium magnesium silicate, calcium chromium silicate, and calcium silicate titanate.

Typical single oxide fillers are silica, alumina, zirconia, titania, magnesia, hafnia, and the rare earth oxides including didymium oxide and thoria. A typical group of suitable oxides and their free energies of formation is shown below:

| Oxide | ΔF at 1,000° C. | Oxide | ΔF at 1,000° C. |
|---|---|---|---|
| $Y_2O_3$ | 125 | $ZrO_2$ | 100 |
| $CaO$ | 122 | $BaO$ | 97 |
| $La_2O_3$ | 121 | $ZrSiO_4$ | 95 |
| $BeO$ | 120 | $TiO$ | 95 |
| $ThO_2$ | 119 | $TiO_2$ | 85 |
| $MgO$ | 112 | $SiO_2$ | 78 |
| $UO_2$ | 105 | $Ta_2O_5$ | 75 |
| $HfO_2$ | 105 | $V_2O_3$ | 74 |
| $CeO_2$ | 105 | $NbO_2$ | 70 |
| $Al_2O_3$ | 104 | $Cr_2O_3$ | 62 |

The filler oxide in processes of the present invention originally is in the form of ultimate particles smaller than 5 millimicrons. The size of particle is an average dimension. For spherical particles all three dimensions are equal and the same as the average. For anisotropic particles the size is considered to be one-third of the sum of the three particle dimensions. Thus, a fiber of refractory oxide 7 millimicrons long but only 1 millimicron wide and thick would have an average dimension of 3 millimicrons and hence could be grown to the desired size according to the present invention.

Calcium oxide is a particularly refractory material and hence is a preferred filler. However, this oxide is water soluble, or more accurately, water reactive; hence, it cannot be obtained as the desired precipitate. In this instance, one can precipitate an insoluble calcium compound, such as the carbonate or oxalate, which, on heating, will decompose to the oxide. In the processes of the present invention, such heating to decompose a compound to the desired refractory oxide is carried out prior to or simultaneously with the heating to effect growth of the particles, and in any event is completed before reduction of the coprecipitate of matrix metal oxygen compound is started.

PRECIPITATING THE COMPOUND OF MATRIX METAL IN THE OXIDIZED STATE

Having selected the ultimate matrix metal and an ultimate refractory oxide to be dispersed therein, the coprecipitation step is initiated. Any method can be used which effects coprecipitation of a compound of the matrix metal in an oxidized state and the refractory oxide. Ordinarily, this is most readily accomplished by mixing solutions of soluble compounds of the two components followed by precipitation as indicated.

Water-soluble salts of the matrix metals are particularly suitable as starting materials in the processes of this invention. Because of their solubility, nitrates are especially easy to use, ferric nitrate, cobalt nitrate, nickel nitrate, lead nitrate, and silver nitrate being examples. Chlorides are also good starting materials, molybdenum pentachloride, tin tetrachloride, ferric chloride, ferrous chloride, nickel chloride, copper chloride, and bismuth chloride being examples. Other soluble salts such as bromides, iodides, acetates, formates, sulfates and perchlorates are similarly suitable. With matrix metals such as molybdenum, salts in which the metal is in the anion are also suitable, sodium molybdate, ammonium molybdate and potassium molybdate being examples.

The matrix metal is now precipitated in the form of an insoluble compound. Thus, the precipitated compound can be the oxide, hydroxide, hydrous oxide, oxycarbonate, hydroxycarbonate, hydroxy nitrate, or hydroxychloride of the matrix metal. Since these compounds, as precipitated, usually contain varying amounts of water, they can be referred to generally as hydrous, oxygen-containing compounds of the metal. The insoluble matrix metal compound can, if desired, be the sulfide of the metal.

A coprecipitate of nickel sulfide and aluminum hydroxide can, for example, be prepared by adding (a) an alkaline solution of sodium sulfide and (b) a solution containing aluminum chloride and nickel chloride, simultaneously to a heel of water. On recovering the precipitate so formed, drying it, and roasting it in air the nickel sulfide present is converted to nickel oxide, and upon reducing, alumina in metallic nickel is produced.

The refractory oxide filler need not be in its final form as coprecipitated. In preparing a dispersion of calcium oxide in molybdenum, for instance, one can coprecipitate calcium molybdate and molybdenum hydroxide. By roasting in air and then reducing, the molybdenum compounds are converted to the metal and the calcium is converted to the oxide. Similarly, to incorporate barium oxide as a filler in chromium alloys of nickel, one can originally coprecipitate barium chromate and nickel hydroxide, or to prepare silica in iron, one can originally coprecipitate iron silicate with iron sulfide or iron hydroxide.

In general, mixed oxides or mixed hydroxides can be precipitated, including metal chromates, silicates, zirconates, titanates, aluminates, molybdates, tungstates, or even those containing more than two metals, like calcium, iron, silicate, or calcium, aluminum, molybdate.

The precipitated matrix metal compound can be one of a single metal or of two or more metals. For example, the hydrous oxides of both nickel and cobalt can be deposited together with the filler. In the latter case, an alloy of cobalt and nickel is produced directly, during the reduction step. In a similar manner, alloys of iron, cobalt or nickel, for example, can be prepared with other metals which form hydrogen-reducible, hydrous, oxygen-containing compounds. Thus, alloys with copper, molybdenum, tungsten, and rhenium can be prepared by co-depositing two or more oxides of the selected metals with the refractory oxide filler.

Methods for precipitating oxygen-containing metal compounds from solutions of the corresponding metal salts are well known in the art and any such method can be used. For instance, an alkali can be added to a concentrated solution of the metal nitrate. When, on the other hand, the metal is in the form of a basic salt, such as sodium molybdate, precipitation can be effected by acidifying.

As precipitating agents for the nitrates and chlorides, for instance, one may use hydroxides such as sodium hydroxide, ammonium hydroxide, ammonium carbonate, sodium carbonate, sodium oxalate, potassium carbonate, potassium hydroxide, or ammonium bicarbonate. As precipitating agents for the basic salts such as molybdates, one can use acids such as hydrochloric acid and nitric acid in controlled quantities. It will be remembered that refractory metal oxide which is coprecipitated may be soluble in an excess of the precipitant used for the matrix metal compound and hence, the precipitant selected will be one which does not effect solution of the coprecipitate.

PRECIPITATING THE REFRACTORY OXIDE

The art is already familiar with various ways to precipitate the refractory oxides which are here used as fillers and any of such methods can be used. Certain processes have already been described above and others are equally applicable.

A preferred method of precipitating the refractory oxide is to add a precipitant to a water solution of a salt of the metal of the oxide. Water-soluble salts which can be used include the nitrates, chlorides, sulfates, perchlorates, acetates, formates and similar compounds of the metals involved. For instance, one can use magnesium nitrate, magnesium chloride, magnesium bromide, magnesium sulfate, magnesium acetate, or magnesium formate when magnesium oxide is to be the filler. Similarly, one can start with salts of calcium, aluminum, or rare earths, such as nitrates, chlorides, sulfates, acetates, or the like. In the case of titania, one could start with a hydrochloric acid solution containing titanium tetrachloride. For silica one could start with sodium silicate and acidify.

For the more acidic salts, which are precipitated with alkalis, one can use as precipitating agents, for instance, ammonium hydroxide, ammonium carbonate, sodium carbonate, potassium carbonate, ammonium bicarbonate, and the like. As precipitants for the basic salts such as sodium silicate one can use such acids as hydrochloric, sulfuric, nitric, and the like. Again, in the selection of a precipitant one will give consideration to the effect that such precipitant will have upon the coprecipitate of matrix metal compound.

In a preferred instance, the nitrates of both the matrix metal and the metal to be present as refractory oxide are used along with ammonia compounds such as ammonium hydroxide or ammonium carbonate as the precipitating agents. In this way, the salt which is formed in the neutralization reaction is ammonium nitrate, and this material is readily decomposed and removed during a later heating step in the process.

COPRECIPITATION

It is characteristic of the processes of this invention that the matrix metal compound and the refractory oxide are coprecipitated. This means that they will be deposited together rather than separately. It has been found that the necessary intimate mixture of refractory oxide and matrix metal compound cannot be achieved by such methods as separate precipitation followed by intensive mixing.

The coprecipitation can convenienly be accomplished, for instance, by adding the soluble salts of the two components to an aqueous alkaline solution while maintaining the pH in a range which will cause complete precipitation of the desired compound. A practicable way to do this is to add simultaneously, but separately, three solutions, viz., the solutions of each of the metal components and of the precipitating agent, to a heel of water. Alternatively, an aqueous solution of the precipitating agent can be used as the heel to which the two soluble metal salt solutions are added.

As an example of the foregoing procedure, to make a composition of thoria as the refractory oxide in cobalt as the matrix metal, one can prepare three stock aqueous solutions: (1) cobalt nitrate, (2) thorium nitrate, and (3) ammonium carbonate. These three solutions are added to water in such a way that the hydroxycarbonate of cobalt and the hydroxide of thoria are coprecipitated. In some instances, it is advantageous to combine the two metal salt solutions prior to reaction; thus, in this case the solution of cobalt nitrate and thorium nitrate could be combined.

Similarly, to prepare a coprecipitate of a lead compound and silica, one can prepare two solutions: (1) sodium silicate containing excess alkali, and (2) lead nitrate. By mixing these solutions one can form a coprecipitate of lead silicate and lead hydroxide.

As already mentioned, processes of the invention are applicable to the preparation of dispersions of refractory oxides in alloys. Thus, for example, one can coprecipitate the metal hydroxides from such soluble metal salts as ferric nitrate, nickel nitrate, and aluminum nitrate, in the presence of each other, as by adding a solution of these three nitrates to ammonium carbonate solution. In this instance, an iron-nickel alloy containing alumina can be produced. To make alloys of nickel and molybdenum, for example, one can use as starting materials molybdenum pentachloride, nickel chloride, and thorium nitrate. By coprecipitating these materials as hydrous oxides with sodium hydroxide, one can form a coprecipitate of molybdenum hydrous oxide with nickel hydrous oxide and hydrous thoria, from which one can obtain a molybdenum-nickel alloy containing thoria. In many instances, it is advantageous to effect the coprecipitation from relatively dilute solutions. The coprecipitates so obtained are more homogeneous and the separate components are more thoroughly dispersed with respect to each other than when concentrated solutions are used.

The amount of refractory oxide filler in the final matrix metal can be regulated by adjusting the relative amounts of the two soluble metal salts added during the coprecipitation reaction. Ordinarily, a relatively large amount of a hydrous, oxygen-containing compound of the matrix metal will be coprecipitated with a relatively small amount of the refractory oxide filler. These relative amounts can be considerably varied, but in preferred compositions from 0.5 to 20 volume percent of refractory oxide filler will be present in the final matrix metal. The relative quantities of original reactants can thus be readily calculated for any particular combination of matrix metal and refractory oxide.

GROWING THE REFRACTORY OXIDE ULTIMATE PARTICLES

To prepare the coprecipitate for the roasting step, it is first preferably filtered off, washed and dried. Conventional methods well known in the art can be used. In the dried coprecipitate prepared as above described, the ultimate particles of refractory oxide, though present as aggregates, will have a size below about 5 millimicrons. It is essential that these be grown to a larger size. It is also essential that any sulfur, nitrogen or carbon-containing precipitates be converted to the oxides.

The growth of the refractory oxide particles from a size range below 5 millimicrons to one in the range of 5 to 500 millimicrons is accomplished by heating the coprecipitate to a temperature from 400 to 1000° C. This heating can be effected by any means with which the art is familiar, such as heating in a furnace, and is continued until the refractory oxide particles have reached the desired size.

For refractory oxides having a free energy of formation near the lower limit of the operable range, that is, not much above 60 kilocalories, growth is relatively rapid even at temperatures near the lower end of the above-mentioned range. Accordingly, the time of heating and the temperature, for such oxides, will represent the minimums. On the other hand, the more refractory of the oxides—that is, those having very high free energies of formation, such as thoria—will require longer heating times and temperatures near the upper end of the recited range.

The size of the refractory oxide filler particles can be determined by techniques commonly used in the art, such as electron microscopy or X-ray line broadening.

By conducting this roasting process in air, or other oxygen-containing atmosphere, sulfides are oxidized, and hydrates, nitrates, and carbonates are decomposed. As a result, the precipitate is converted to the anhydrous oxide of the metal containing dispersed therein particles of refractory filler oxide of the desired size.

REDUCING THE MATRIX METAL COMPOUND

The refractory oxide filler particles having been grown to the desired extent, the matrix metal compound is then reduced to the corresponding metal. Except when the matrix metal is manganese, niobium, silicon, tantalum, titanium or vanadium, this can be done conveniently by subjecting the heat-treated coprecipitate to a stream of hydrogen at a somewhat elevated temperature. The temperature throughout the entire mass must not be allowed to exceed the sintering temperature of the filler particles. One way to accomplish this is to place the product in a furnace at a controlled temperature and add hydrogen gas slowly; in this way, the reduction will not proceed so rapidly that large amounts of heat are liberated causing the temperature to get out of control.

The hydrogen used in the reduction can be diluted with an inert gas such as argon to reduce the rate of reaction and avoid "hot spots." In this way the heat of reaction is carried away in the gas stream. Alternatively, the temperature in the furnace can be slowly raised into the range of 500 to 1000° C. while maintaining a flow of hydrogen over the product to be reduced.

In addition to or instead of hydrogen, other reducing agents such as carbon monoxide, or methane and other hydrocarbon gases can be used as the reducing agent. In any case, it is important to control the temperature during reduction, not only to avoid premature sintering as abovementioned, but also so that excessive reaction will not occur between the reducible matrix metal compound and the filler oxide prior to complete reduction of the matrix metal compound.

Reduction should be continued until the matrix metal compound is essentially completely reduced. When reduction is nearing completion, it is preferred to raise the temperature in the case of iron, cobalt or nickel, for example, to the range between 700 and 1300° C. to complete the reaction, but care must be taken not to exceed the melting point of the reduced metal. During the reduction process very fine metal grains are formed. These tend to fuse and grow, but their ultimate size is restricted because of the presence of the filler particles. Thus, the size of grains obtained in this way is usually less than 10 microns.

Reduction should be carried out until the oxygen content of the mass is substantially reduced to zero, exclusive of the amount of oxygen originally introduced in the form of the oxide filler material. In any case, the oxygen content of the product, exclusive of the oxygen originally introduced in chemically combined form in the filler, should be in the range from 0 to 0.5% and preferably from 0 to 0.1%, based on the weight of the product.

The analysis for oxygen can be done by many methods with which the art is familiar, one such method being vacuum fusion as described by R. A. Yeaton in Vacuum, vol. 2, No. 2, page 115, "The Vacuum Fusion Technique as Applied to Analysis of Gases in Metals."

After the reduction reaction is complete, the resulting powder tends to be pyrophoric. For this reason, a sintering step as hereinafter described is added to reduce the surface area and eliminate this pyrophoric character.

Since in the processes of the present invention the refractory oxide particles have previously been grown to the desired size, there is no danger of further substantial growth at the temperatures of reduction. The processes, therefore, enable one to control accurately the size of the refractory oxide particles in the final product.

When the insoluble matrix metal compound cannot be reduced to the metal with hydrogen—that is, when the matrix metal is to be manganese, niobium, silicon, tantalum, titanium or vanadium—reduction can be effected by contacting the matrix metal compound with a reducing metal in a fused salt bath. The compound to be reduced, containing the refractory filler, is dispersed in the molten salt and the reducing metal is added while maintaining the temperature of the molten salt in the range of 400 to 1200° C.

The fused salt bath is merely a medium whereby to effect contact of the reducing agent and the metal compound under conditions which will not affect the disposition of the compound with respect to the refractory particles. It can comprise any suitable salt or mixture of salts having the necessary stability, fusion point, and the like.

Suitable fused salt baths can comprise halides of metals selected from groups I and IIa of the periodic table.

In general, the chlorides and fluorides are preferred halides. Bromides or iodides can be used, although their stability at elevated temperatures is frequently insufficient. Chlorides are especially preferred. Thus, among the preferred salts are calcium chloride, sodium chloride, potassium chloride, barium chloride, strontium chloride, and lithium chloride and fluoride.

The fused salt bath will usually be operated under a blanket of either an inert gas or a reducing gas. Such gases as helium, argon, hydrogen or hydrocarbon gases can be used in this capacity.

The temperature of the reduction can be varied considerably depending upon the combination of fused salt and reducing metal selected. In general, the temperature of reduction will be between 400 and 1200° C. It is usually preferred to select a reduction temperature at which the reducing metal, as well as the fused salt, is present in a molten state. Usually the operating temperature will also be below the boiling point of the reducing metal employed.

The operating temperature of the reduction bath must also be below the melting point of the metal coating to be produced on the refractory filler. For example, if a tungsten compound is being reduced upon particles of thoria, reduction temperatures as high as 1200° C. can be employed. However, if a compound of copper, or a copper-containing alloy having a low melting point, is being reduced, the reduction temperature should be maintained below that of the melting point of the copper or the alloy.

The reducing metal is selected from the group consisting of alkali and alkaline earth metals. Thus, the metal can be lithium, sodium, potassium, rubidium, caesium, beryllium, magnesium, calcium, strontium, or barium.

It is preferred to use a reducing metal which has a low solubility in the solid state with respect to the metal of the coating on the refractory oxide particles; otherwise, one will get undesirable alloying of the reducing metal with the metal formed by the reduction. For this reason, calcium and sodium are suitable for reducing compounds of such metals as iron, cobalt, nickel, chromium, or tungsten, while magnesium and sodium are useful in reducing titanium.

It is preferable to use a temperature of reduction at which the reduction proceeds at a rapid rate. For reducing cobalt, iron, and nickel compounds, temperatures in the range of 600 to 800° C. are suitable. With compounds of metals such as chromium, titanium, and niobium, temperatures in the range of 850 to 1000° C. are used.

Completion of the reduction reaction can be determined by taking samples from the melt, separating the product from the fused salt, and analyzing for oxygen by ordinary analytical procedures such as vacuum fusion. The reduction is continued until the oxygen content of the mass is substantially reduced to zero, exclusive of the oxygen of the oxide refractory material. As in the case of hydrogen reduction, the oxygen content of the product, exclusive of the oxygen in the refractory, should be in the range of from 0 to 0.5% and preferably from 0 to 0.1%, based on the weight of the product.

The reduced product is present as a suspension in the fused salt bath. It can be separated therefrom by the techniques ordinarily used for removing suspended materials from liquids. Gravitational methods such as settling, centrifuging, decanting and the like can be used, or the product can be filtered off. Alternatively, the bath can be cooled and the fused salt dissolved in a suitable solvent such as dilute, aqueous nitric acid or acetic acid.

If a considerable excess of reducing metal is used in the reduction step, it may be necessary to use a solvent less reactive than water for the isolation procedure. In such a case, methyl or ethyl alcohol is satisfactory. The presence of a small amount of acid in the isolation solvent will dissolve any insoluble oxides formed by reaction between the reducing metal and the oxygen content of the coating being reduced. After filtering off the reduced metal powder, it can be dried to free it of residual solvent.

SINTERING THE REDUCED PRODUCT

After the matrix metal compound has been reduced to the corresponding metal the product is sintered by heating it to an elevated temperature which is, however, below the melting point of the metal. It will be recognized that when very high temperatures are used during the reduction step, some sintering can occur simultaneously with reduction; however, such temperatures should be reached only after the reduction has proceeded to a considerable degree and preferably is substantially complete.

The sintering insures that the products will not be readily reoxidized in air.

Sintering of the product is continued until the surface area is lowered below 1, and preferably below 0.1, square meter per gram. Such products are not pyrophoric and can be handled in air.

It has been observed that the temperature required to obtain the desired degree of sintering varies with the loading of the filler in the metal. In general, the higher the loading, the higher is the sintering temperature required.

It is important that, during this sintering operation, the melting point of the metal be not exceeded. Actually, it is preferred to maintain the temperature at least 50 centigrade degrees below the melting point.

COMPACTING THE REDUCED PRODUCT

The reduced products are useful for compaction to metals containing the dispersed refractory oxide of desired size. They can be mixed with other metals prior to such compaction and thus are useful in making alloys or as masterbatches which can be diluted with additional amounts of the same matrix metal.

The reduced products, if desired, can be compacted according to techniques with which the art is already familiar, until the density of the compacted mass is from 90 to 100 percent of the theoretical density. Thus, the products can be compacted by pressing in a die, by extruding, by rolling, by swaging or by any method used in powder metallurgy.

The green compact formed as above described can be further treated by sintering it, as at temperatures up to 90 percent of its melting point for up to twenty-four hours, to give it sufficient strength to hold together during subsequent working operations. Preferably such sintering is effected in an atmosphere of clean, dry hydrogen.

To develop maximum strength in the refractory oxide-filled matrix metal, the formed body obtained as above described can be subjected to intensive working, preferably at elevated temperatures. The working forces should be sufficient to effect plastic flow in the metal. Working should be continued until homogenization of the filler-matrix metal grains is substantially complete. Homogeneity can be determined by metallographic and chemical analyses.

While working can be accomplished by such methods as swaging, forging, and rolling, it is especially preferred to effect working by extruding the above-mentioned green compact through a die under extreme pressure, at temperatures approaching the melting point of the metals present, say, from 85 to 95 percent of the melting temperatures in degrees absolute. Because the products are very hard, the working conditions needed are much more severe than for the unmodified metals. In the case of extrusion of a billet, the reduction in cross-sectional area preferably is upwards of 90 percent. Welding of the metal grains becomes nearly complete.

UTILITY OF THE PRODUCT

The products obtained as above described have substantially improved properties. The metals and alloys have improved strength and hardness, especially at high temperatures, by reason of the inclusion of the grown refractory oxide particles. Thus, the higher melting metals are suitable for use as components in high-temperature systems such as in jet engines and heat exchangers.

EXAMPLES

The invention will be better understood by reference to the following illustrative examples:

Example 1

This example illustrates the preparation of a dispersion of zirconia particles in nickel metal by a process of the invention.

A solution of nickel nitrate was prepared by dissolving 4362 grams of nickel nitrate hydrate,

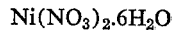

$Ni(NO_3)_2 \cdot 6H_2O$ in water and diluting this to 5 liters. A zirconium oxychloride solution was prepared by dissolving 200 grams of zirconyl chloride, $ZrOCl_2 \cdot 8H_2O$, in water and diluting to 5 liters. To a heel consisting of 5 liters of water, at room temperature, these two solutions were added simultaneously but separately, at equal rates, while simultaneously there was added an ammonium hydroxide-ammonium carbonate solution in stoichiometric amounts required for coprecipitation. During the precipitation the pH in the reactor was maintained in the range between 7.2 and 7.8. Thus, a coprecipitate of nickel hydroxide carbonate and zirconium hydrous oxide was prepared, in which the ultimate zirconium oxide particles were smaller than 5 millimicrons. The resulting mixture was filtered, and washed to remove the ammonium nitrate. The filter cake was then dried in an oven at 125° C. At this stage of the process, the zirconia particles were about 3 mμ in size.

The product so obtained was pulverized with a hammer mill to pass 325 mesh, and placed in an oven, and heated at a temperature of 800° C. until the size of the ultimate zirconium oxide particles had grown to about 50 mµ. Hydrogen was then slowly passed over the powder at 500° C. at such a rate that sufficient hydrogen was added to the mass to reduce the nickel oxide to metal in a period of 4 hours. This rate of flow of hydrogen was maintained for a period of 8 hours. Thereafter, the temperature was raised slowly, and the flow of hydrogen increased until finally a temperature of 750° C. was reached, whereupon a large excess of hydrogen was passed over the product in order to complete the reduction. The resulting powder was compressed in a die of 1-inch diameter at a pressure of 20 tons per square inch, the mass sintered in dry hydrogen slowly while increasing the temperature to 1000° C., and thereafter the material was machined to ¾-inch diameter and finally extruded to form a ¼-inch rod.

The resulting product was a nickel metal rod containing zirconia uniformly dispersed therein. This rod had improved high-temperature properties, when compared with control nickel, for example, in yield and stress-rupture strength.

*Example 2*

By substituting molybdenum pentachloride for nickel nitrate, in Example 1, a coprecipitate of the hydrous oxide of molybdenum and zirconia was prepared at a volume loading of 4% $ZrO_2$ in molybdenum. In this instance, ammonia was used as the precipitating agent and reduction was carried out in the final stages at a temperature of 800° C. The resulting molybdenum-zirconia powder was cold-compacted, sintered at 1500° C., and finally further compacted by forging.

*Example 3*

This example describes a process for preparing an improved stainless steel alloy powder. The preparation of the metal-thoria composition was carried out as in Example 1, using the following feed solutions: (a) 3.7 liters of solution prepared from 2,043 grams $Fe(NO_3)_3 \cdot 9H_2O$ 198 grams $Ni(NO_3)_2 \cdot 6H_2O$, 555 grams $Cr(NO_3)_3 \cdot 9H_2O$ and distilled water, (b) 33.10 grams $Th(NO_3)_2 \cdot 4H_2O$ dissolved in distilled water and diluted to 3.7 liters, and (c) 3.7 liters of 3.5 M $(NH_4)_2CO_3$. The solutions were added to a heel of water over a period of forty-eight minutes. The final pH was 7.60. The resulting slurry was filtered, washed and dried in an oven at 240° C.

This powder was pulverized to 325 mesh and then reduced with hydrogen. Extreme care was taken to purify and dry the hydrogen used. Thus, commercial tank hydrogen was passed through a drier to remove the water, and then over chips of chromium and zirconium-titanium, said chips held at 850 to 900° C., in order to remove oxygen and nitrogen. In this way, extremely dry, pure hydrogen was prepared.

The first stage of the reduction was carried out at 700° C. In this manner Ni-Fe metal, containing $ThO_2$ particles, and intimately admixed with $Cr_2O_3$, was produced. The temperature was then raised to 1100° C., and the $Cr_2O_3$ converted to Cr. Passage of pure, dry hydrogen over the sample at 1100° C. was continued until the dew point of the effluent hydrogen was −50° C.

Oxygen analysis of the final mixture showed that there was less than 0.05% oxygen present in excess of the oxygen in the $ThO_2$.

*Example 4*

This example describes the preparation of a nickel-thoria composition by a process of this invention.

The reactor used to prepare the coprecipitate of thorium-nickel hydrous oxycarbonate consisted of a stainless steel tank with a conical bottom. The bottom of the tank was attached to stainless steel piping, to which were attached two inlet pipes through T's, this circulating line then passed through a centrifugal pump of 20 g.p.m. capacity, and from the pump the line was returned to the tank. Initially, the tank was charged with 2 gallons of water. Equal volumes of two solutions containing the desired quantities of reagents were then added into the middle of the flowing stream through ⅛-inch diameter tubing attached to the T tubes. These solutions were added at uniform equivalent rates over a period of about one-half hour. Through the first T was added a solution of thorium nitrate-nickel nitrate prepared by dissolving 230 grams $Th(NO_3)_4 \cdot 4H_2O$ and 4400 grams $Ni(NO_3)_2 \cdot 6H_2O$ in water and diluting to 5.0 liters. Through the second T was added 5.0 liters of 3.5 molar $(NH_4)_2CO_3$.

The solutions were added into the reactor simultaneously while the pump was in operation. The rate of addition was controlled uniformly by flow meters. The pH of the solution in the tank was taken at frequent time intervals to insure proper operating, the final pH being 7.7. The slurry was circulated for a few minutes after the addition of the reagents had been completed, and then the solution was pumped into a filter. The precipitate was filtered and washed with water, and dried at a temperature of about 300° C. for twenty-four hours.

This product was then pulverized by grinding in a hammer mill, and screened to pass 325 mesh.

The product was then placed in a furnace at a temperature of about 100° C., and a mixture of argon and hydrogen was slowly passed over the dried powder. This gas stream was carefully freed of oxygen and dried. The temperature in the furnace was slowly raised over a period of an hour. The flow of hydrogen was then gradually increased and the temperature in the furnace also, until a temperature of 600° C. was reached, whereupon a large excess of hydrogen was passed over the sample in order to complete the reduction. Finally, the temperature was raised to 1040° C., while continuing to pass hydrogen over the sample. In this way a thoria-nickel powder was produced. Analysis of the powder showed that it contained only 0.05% oxygen in excess of that in the thoria.

This application is a continuation-in-part of our co-pending application Serial No. 749,611, filed July 21, 1958, now abandoned.

We claim:

1. In a process for making a dispersion of a refractory metal oxide in another metal the steps comprising coprecipitating (a) a water-insoluble compound of a metal, said compound being one which when heated in air at a temperature in the range from 400 to 1000° C. is converted to an oxide of the metal and said metal being one having an oxide with a free energy of formation at 27° C. of up to 105 kilocalories per gram atom of oxygen in the oxide, and (b) a refractory metal oxide having a free energy of formation at 1000° C. greater than 60 kilocalories per gram atom of oxygen in the oxide, the ultimate particles of the refractory oxide having a size less than 5 millimicrons, roasting the coprecipitate in an oxygen-containing atmosphere at from 400 to 1000° C. whereby the water-insoluble compound of the metal is converted to the anhydrous metal oxide, and the size of the ultimate refractory oxide particles is increased, continuing the heating in said temperature range until the size of said ultimate particles is in the range of from 5 to 500 millimicrons, thereafter reducing said metal oxide to the corresponding metal and sintering the reduced product until the surface area is less than ten square meters per gram.

2. A process of claim 1 in which the insoluble metal compound (a) is an oxygen-containing compound of the metal.

3. A process of claim 1 in which the insoluble metal compound (a) is a sulfide of the metal.

4. A process of claim 1 in which the reduction of the metal oxide is continued until the oxygen content of the mass, exclusive of the oxygen in the refractory oxide particles, is less than 0.1% by weight.

5. A process of claim 1 in which coprecipitation of metal compound (a) and refractory oxide (b) is effected by mixing a precipitant with aqueous solutions of them.

6. In a process for making a dispersion of a refractory metal oxide in another metal the steps comprising coprecipitating (a) a hydrous oxide compound of a metal, said metal being one having an oxide with a free energy of formation at 27° C. of up to 105 kilocalories per gram atom of oxygen in the oxide, and (b) a refractory metal hydrous oxide having a free energy of formation at 1000° C. greater than 60 kilocalories per gram atom of oxygen in the oxide, the ultimate particles of the refractory oxide having a size less than 5 millimicrons, heating the coprecipitate to from 400 to 1000° C. whereby the coprecipitate is dehydrated and the size of the ultimate refractory oxide particles is increased, continuing the heating in said temperature range until the size of said ultimate particles is in the range of from 5 to 500 millimicrons, thereafter reducing metal compound (a) to the corresponding metal, sintering the reduced product and compacting it to from 99 to 100% of theoretical density.

References Cited in the file of this patent
UNITED STATES PATENTS

| | | |
|---|---|---|
| 2,893,859 | Triffleman | July 7, 1959 |
| 2,949,358 | Alexander et al. | Aug. 16, 1960 |